(12) United States Patent
Päkel et al.

(10) Patent No.: US 11,485,401 B2
(45) Date of Patent: Nov. 1, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Florian Päkel, Mauren (LI); Dennis Poggemann, Feldkirch (AT); Frank Pasch, Baden-Baden (CH); Mathias Fehr, Feldkirch (AT); Alexander Malachow, Lindau (DE)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/962,591

(22) PCT Filed: Jan. 30, 2019

(86) PCT No.: PCT/EP2019/052161
§ 371 (c)(1),
(2) Date: Jul. 16, 2020

(87) PCT Pub. No.: WO2019/149714
PCT Pub. Date: Aug. 8, 2019

(65) Prior Publication Data
US 2020/0406953 A1     Dec. 31, 2020

(30) Foreign Application Priority Data

Feb. 2, 2018  (DE) .................. 10 2018 201 638.0

(51) Int. Cl.
*B62D 1/19* (2006.01)
*B62D 1/184* (2006.01)

(52) U.S. Cl.
CPC ............. *B62D 1/195* (2013.01); *B62D 1/184* (2013.01)

(58) Field of Classification Search
CPC ........ B62D 1/195; B62D 1/184; B62D 1/192; B60R 16/0215
See application file for complete search history.

(56) References Cited

U.S. PATENT DOCUMENTS

| 4,379,954 | A |   | 4/1983 | Iwata |   |
|---|---|---|---|---|---|
| 5,106,040 | A | * | 4/1992 | Cafmeyer | ................ H02G 3/26 248/292.14 |

(Continued)

FOREIGN PATENT DOCUMENTS

| CN | 103608240 A | 2/2014 |
|---|---|---|
| CN | 103625535 A | 3/2014 |

(Continued)

OTHER PUBLICATIONS

English Translation of International Search Report issued in PCT/EP2019/052161, dated May 14, 2019.

*Primary Examiner* — Drew J Brown
(74) *Attorney, Agent, or Firm* — thyssenkrupp North America, LLC (57) ABSTRACT

A steering column may include a casing unit that can be connected to a body of a motor vehicle. A steering spindle may be rotatably mounted in the casing unit about a longitudinal axis. The casing unit may have an inner casing that is received in an outer casing so as to be telescopically adjustable in a direction of the longitudinal axis. A clamping device may be switchable between a fixing position in which it fixes the inner casing relative to the outer casing and a release position in which it allows telescopic adjustment of the inner casing relative to the outer casing. An energy absorption device may include a deformation element arranged between the inner casing and the outer casing. The casing unit may comprise a cable mounting that includes a (Continued)

fastening element for holding a cable and that is at least partly formed as a deformation element.

19 Claims, 4 Drawing Sheets

(56) References Cited

U.S. PATENT DOCUMENTS

| | | | |
|---|---|---|---|
| 6,523,432 B1 | 2/2003 | Yamamoto | |
| 7,325,833 B2 * | 2/2008 | Sawada | B62D 1/16 280/775 |
| 7,661,711 B2 * | 2/2010 | Menjak | B62D 1/195 280/777 |
| 7,810,408 B2 * | 10/2010 | Okamoto | B62D 1/195 74/493 |
| 8,539,855 B2 * | 9/2013 | Schnitzer | B62D 1/195 74/493 |
| 8,833,799 B2 * | 9/2014 | Kwon | B62D 1/195 280/777 |
| 11,052,839 B2 * | 7/2021 | Iwahara | H02G 3/32 |
| 2012/0266716 A1 | 10/2012 | Sulser et al. | |
| 2014/0053677 A1 | 2/2014 | Sakata | |
| 2015/0232116 A1 | 8/2015 | Yokota | |
| 2015/0232118 A1 | 8/2015 | Yamamoto | |
| 2017/0043803 A1 | 2/2017 | Yamamoto | |
| 2018/0050719 A1 | 2/2018 | Agbor et al. | |
| 2018/0093697 A1 | 4/2018 | Forte et al. | |

FOREIGN PATENT DOCUMENTS

| | | |
|---|---|---|
| CN | 107567408 A | 1/2018 |
| DE | 3039832 A | 5/1981 |
| DE | 10 2012 111 890 B | 12/2013 |
| DE | 10 2014 011 965 A | 2/2016 |
| DE | 102015204476 B3 | 5/2016 |
| JP | 2002 337699 A | 11/2002 |
| KR | 2017 0032975 A | 3/2017 |
| WO | 2016/023713 A | 2/2016 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2019/052161, filed Jan. 30, 2019, which claims priority to German Patent Application No. DE 10 2018 201 638.0, filed Feb. 2, 2018, the entire contents of both of which are incorporated herein by reference.

FIELD

The present disclosure generally relates to steering columns, including steering columns with energy absorption devices.

BACKGROUND

The invention concerns a steering column for a motor vehicle, comprising a casing unit which can be directly or indirectly connected to a body of a motor vehicle, and in which a steering spindle is mounted so as to be rotatable about its longitudinal axis, and which has an inner casing that is received in an outer casing so as to be telescopically adjustable in the direction of the longitudinal axis; a clamping device that can be switched to a fixing position in which it fixes the inner casing relative to the outer casing, or a release position in which it allows a telescopic adjustment of the inner casing relative to the outer casing; and an energy absorption device which has a deformation element arranged between the inner casing and the outer casing.

Via the steering wheel attached to the rear end of the steering column (viewed in the direction of travel), the driver can give a steering command which introduces a steering moment for steering the vehicle. The steering spindle is rotatably mounted in a casing unit which is connected to the vehicle body either directly or indirectly via a carrier unit. To adjust the steering wheel position relative to the driver's position, in a generic steering column, a length adjustment is possible in that the casing unit has an inner casing (also known as an inner casing tube) which is arranged in an outer casing (also known as an outer casing tube or guide box) so as to be telescopically movable in the longitudinal direction, i.e. in the direction of the longitudinal axis. A clamping device cooperating with the casing unit allows optional switching between a fixing position and a release position, wherein in the fixing position, the respective setting (i.e. the adjustment position of the steering column) is established, and in the release position the inner casing and outer casing can be adjusted relative to each other.

In addition to the length adjustment, a height adjustment can be achieved in that the casing unit is mounted so as to be adjustable and fixable in the height direction relative to the vehicle body, for example in a carrier unit. The height position can also be fixed via the clamping device.

To improve occupant safety in a vehicle collision, known as a crash, in a generic steering column a so-called crash device with an energy absorption device is provided. The crash device allows the casing unit to be telescopically compressed in the longitudinal direction, even when the clamping device is in the fixing position, if the driver's body hits the steering wheel in a high-speed vehicle collision, wherein a force high enough to exceed the retaining force of the clamping device is only exerted on the steering wheel in a crash. In order to ensure a controlled deceleration of the body hitting the steering wheel, an energy absorption device is fitted which converts the introduced kinetic energy into plastic deformation of an energy absorption element via a prescribed deformation path, for example by widening of a longitudinal hole or slot, tearing of a tear element, bending of the bending element, or a combination of different deformations. In general, suitable designs of energy absorption or crash elements are those which, by conversion of kinetic energy, are deformed or cause deformation on a movement of the inner and outer casing relative to each other while the clamping device is in the fixing position.

Such a steering column is known for example from US 2017/0043803 A1. Here, on the inner casing which is adjustable in the longitudinal direction relative to the body, the energy absorption device has an energy absorption element with a longitudinal hole which, on telescopic movement in the longitudinal direction relative to the outer casing or a carrier unit connected thereto, widens plastically and is deformed along a predefined deformation path in the longitudinal direction, absorbing energy.

An electric switch module, known as a steering column switch, is usually attached to the casing unit of the steering column and contains the electrical switches for actuating the indicators, lights, windscreen wipers and similar. Such a switch module, which is described for example in DE 30 39 832 A1, is connected via cables to the electric in-car network. In order to guide the cables safely and in controlled fashion in the vehicle interior, and to ensure a mechanically protected connection to the switch module even on adjustment of the steering column, it is known to fit cable mountings in the form of panels, retaining loops or brackets, or similar, on the switch module and casing unit.

Such cable mountings must however be produced, supplied and mounted separately, so that because of the plurality of components, the production complexity is high.

Thus a need exists for a steering column which requires a lower production and installation complexity.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to the invention, in a steering column of the type cited initially, it is provided that the casing unit comprises a cable mounting which has at least one fastening element for holding at least one cable and which is at least partly formed as a deformation element.

At least one cable mounting with an energy absorption element is integrated in the steering column according to the invention. This means that the cable mounting comprises at least one functional element serving as a deformation element, or is itself at least partially configured as a deformation element. Thanks to the invention, accordingly a dual function of cable mounting and energy absorption is achieved. The functionally integrated structure allows a reduction in the number of individual components of a steering column to be produced and assembled, whereby advantageously the production and assembly costs are reduced.

A cable means a single core or a group of cores (individual strands) sheathed with insulating material, which serves to transmit energy and/or data in the form of electrical or optical signals. Preferably, the cable has a plug at its free end.

To implement the invention, at least one fastening element of the cable mounting may be connected to the deformation element. Designs of fastening elements may be used which are known in principle and are suitable for separable or inseparable fixing of at least one cable, such as for example looped cable ties or annular or arcuate cable clamps, clip or catch connectors, through which cables can be passed or which can be attached to or on cables and are themselves attached to a body of the cable mounting, which according to the invention as a whole or at least partially forms a deformation element or comprises a deformation element.

A cable can be fixed to the cable mounting by means of separable connections, for example by form-fit and/or force-fit connections such as screw or spring clips, or alternatively or additionally by inseparable connections such as for example bonded, press-fit or weld connections, or by other form-fit, force-fit and/or substance-bonded fixings, or combinations thereof. The fastening element or elements may for example be formed integrally with the cable mounting, such as in the form of bending tabs in which one or more cables can be fixed to a cable mounting by elastic and/or plastic deformation. Alternatively or additionally, separate fastening elements may be provided and then fixed to a cable mounting according to the invention, or one or more fastening elements are firstly fixed to a cable mounting, which according to the invention forms or at least comprises an energy absorption element, and then one or more cables are attached thereto.

Furthermore, it is advantageous that the combination of the functions of cable mounting and guiding with energy absorption according to the invention leads to a particularly compact design of the steering column, which allows improved utilization of the restricted space available in the motor vehicle.

It is furthermore conceivable and possible to mechanically connect a cable, which is attached to the cable mounting, directly or indirectly to a part of the vehicle which is fixed to the body and relative to which the cable mounting executes a movement in the event of a crash, so that the cable is then mechanically stressed and in turn can achieve an additional energy absorption by friction and plastic deformation.

It may be provided that the outer casing is directly or indirectly supported on the body in the direction of the longitudinal axis, and the inner casing is movable relative thereto in the longitudinal direction for adjustment and in the event of a crash, or conversely the inner casing is fixed in the longitudinal direction relative to the body and the outer casing is movable. With respect to the functional structure and arrangement of the cable mounting according to the invention, both embodiments are always included even if this is not expressly mentioned.

It is possible that the cable mounting is attached to the inner casing and/or the outer casing. In principle, known forms of energy absorption elements may be used which are deformed during a relative movement of the inner and outer casings so as to absorb energy, such as for example bending or tearing elements, or combined bending and tearing elements. Designs may be used which are deformed in themselves during a relative movement in a crash, such as for example bending tabs.

Alternatively or additionally, it is possible that the cable mounting cooperates with a deformation element which, on a relative movement of the inner casing and outer casing, moves relative to the cable mounting and continuously deforms the cable mounting plastically in the direction of the longitudinal axis. The deformation element is mounted on a part of the steering column or body which moves relative to the cable mounting in a crash, wherein it plastically deforms the deformation element and/or is itself deformed in order to absorb energy. For example, the cable mounting may comprise as an energy absorption element a bendable or compressible web, a U-shaped or hollow profile or similar, and the deformation element may comprise an anvil, a mandrel or other deflecting or shaping element which deforms the energy absorption element plastically during a relative movement in a crash.

An advantageous embodiment of the invention provides that the clamping device has a clamping bolt which is rotatable about a clamping axis standing transversely to the longitudinal axis and is connected to a clamping mechanism, wherein in the fixing position, the clamping bolt cooperates with the cable mounting in order to deform the cable mounting plastically on a relative movement of the inner casing and outer casing.

Such clamping devices are known in principle in the prior art, for example from the above-mentioned US 2017/0043803 A1. The clamping bolt may be rotated manually or by motor in order to select the fixing or release position, and is connected to a clamping mechanism, for example an equally well-known arrangement with a cam, wedge plate or tilt pin, which converts the rotation of the clamping bolt into a clamping force in the direction of the clamping axis, and whereby the inner and outer casings are clamped or held together and—where applicable—the casing unit with a carrier unit is fixed relative to the body. Together with the clamping device, the clamping bolt is supported on the casing unit such that, due to the relative movement in a crash, the cable mounting according to the invention cooperates with the clamping bolt and is thereby deformed. In this embodiment, the clamping bolt thus also has a dual function, namely to clamp the casing unit and to deform the deformation element. In this way, the production complexity is further reduced.

The above-mentioned embodiment may be implemented in that the clamping bolt passes through a longitudinal slot which is formed in the cable mounting and has a deformation portion. In the adjustment region of the length adjustment, the clamping bolt may be moved freely in the longitudinal slot of the cable mounting in order to adjust the steering column in the longitudinal direction, which for example attached to the inner casing. Outside the adjustment region, in the deformation portion, the longitudinal slot has a smaller width than the diameter of the clamping bolt. In the event of a crash, the clamping bolt is forced beyond the adjustment region into the deformation region, wherein it progressively widens the longitudinal slot plastically in the longitudinal direction over the length of the deformation region which forms the deformation path, whereby energy is absorbed.

In an advantageous embodiment of the invention, the casing unit is mounted on a carrier unit which can be connected to the body of the vehicle. The carrier unit serves for adjustable fixing of the casing unit to the body, preferably in the height direction. For this, it may for example have a bracket which can be fixed to the body and for example has two side cheeks, which lie opposite each other transversely to the longitudinal axis in the manner of a fork and extend in the height direction, and between which the casing unit is arranged so as to be positionable in the height direction, and which can be pressed against each other by means of the clamping device in order to clamp the casing unit. Alternatively, a single side cheek may be provided, to which the casing unit can be fixed by means of the clamping device.

Furthermore, the carrier unit may comprise a pivot bearing which has a pivot axis that is spaced from the bracket towards the front in the direction of travel and runs horizontally, transversely to the longitudinal axis and transversely to the height direction. In the direction of the pivot axis, a bearing bolt supported on the body passes through a bearing opening connected to the casing unit. By pivoting the casing unit about the pivot axis, the height of the steering wheel—arranged at the rear of the steering column in the direction of travel—can be adjusted, wherein the casing unit moves relative to the bracket in the height direction.

The bracket and the pivot bearing may be formed as separate components of the carrier unit which are arranged spaced apart from each other in the longitudinal direction. The bearing opening of the pivot bearing may be integrated in the outer casing. Alternatively, the pivot bearing and the bracket may be formed integrally.

An advantageous embodiment of the invention provides that the carrier unit has a secondary energy absorption device which is configured to absorb kinetic energy during a movement of the carrier unit relative to the body in a crash. In the event of a crash, the cable mounting according to the invention achieves a primary energy absorption during a movement of the casing unit relative to the carrier unit. If the kinetic crash energy introduced into the steering column in the crash is greater than the energy absorption capacity from deformation of the cable mounting, the residual crash energy which is not absorbed by the primary energy absorption device is transmitted to the carrier unit, and from there introduced into a secondary energy absorption device arranged in the force flow between the carrier unit and the vehicle body. This secondary energy absorption device may also comprise energy absorption elements working on known principles, which may be formed between the bracket and the body, and additionally or alternatively between the pivot bearing and the body. For example, the bracket may have a breakaway element in the form of a slide shoe or slide capsule, which in a crash allows the forward movement of the bracket relative to the body in the direction of travel, and the bearing opening of the pivot bearing may be formed as a slot in the longitudinal direction which, outside the pivot axis, has a deformation region with a width which is smaller than the diameter of the bearing bolt. The displacement of the steering column and bracket, on a triggering of the secondary energy absorption device in a crash, causes the bearing bolt to move along the slot with plastic widening of the deformation region. In this way, a higher quantity of energy may be absorbed in a crash, whereby the safety level of steering column is increased.

The phrase "energy absorption" means that the kinetic energy is converted into deformation work and/or heat.

If required, the features described above may be combined with each other in order to implement or amplify advantageous effects for a steering column.

Figure 1:
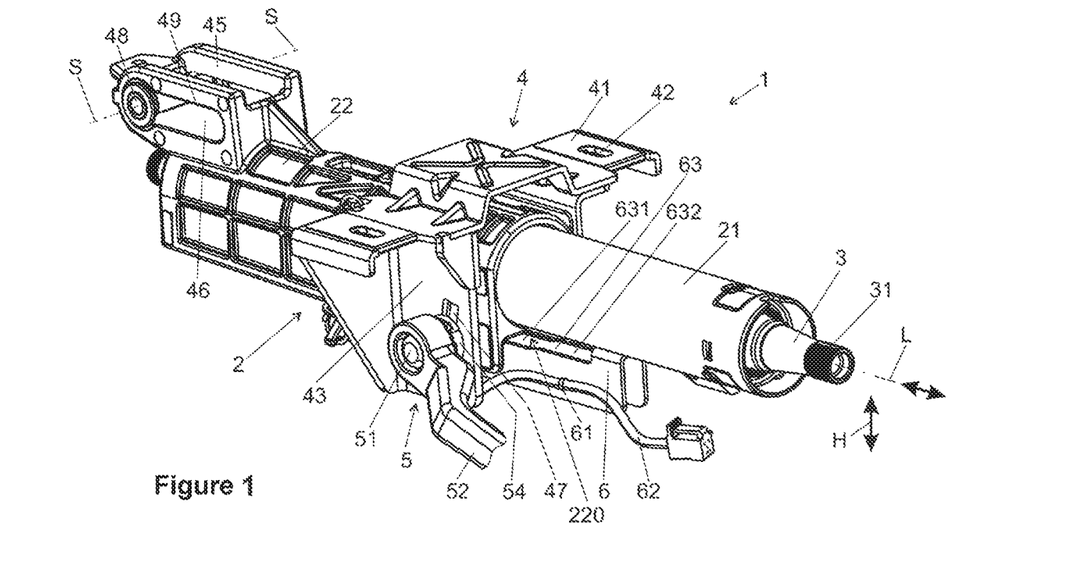
FIG. 1 is a diagrammatic, perspective view of a steering column.
Figure 2:
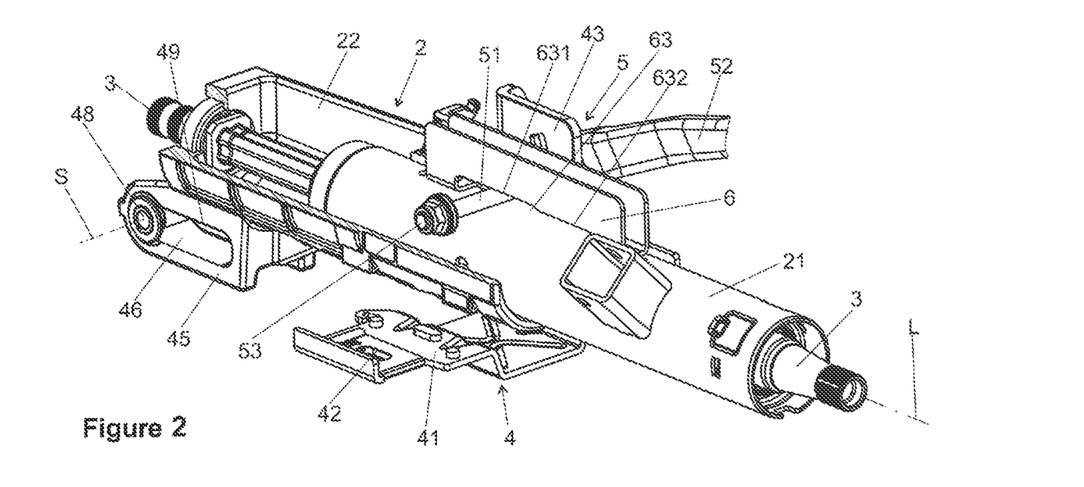
FIG. 2 is a partially-cutaway, perspective view of the steering column from FIG. 1.

FIG. 1 shows, in an oblique view from the top left, a steering column 1 according to the invention in a perspective view from the rear (relative to the direction of travel of a motor vehicle (not shown)), while FIG. 2 shows an oblique view from below.

The steering column 1 comprises a casing unit 2 in which a steering spindle 3 is mounted so as to be rotatable about its longitudinal axis L extending in the longitudinal direction, and which at its rear end has a fastening portion 31 for fastening a steering wheel (not shown). The casing unit 2 comprises an inner casing 21 which is mounted coaxially in an outer casing 22 so as to be telescopically displaceable in the longitudinal direction, as indicated by the double arrow.

A carrier unit 4 comprises a bracket 41 which has a fastening means 42 for connection to a body (not shown), and two side cheeks 43 and 44 which lie opposite each other transversely to the longitudinal axis L and between which the casing unit 2 is held.

As part of the carrier unit 4, a pivot bearing 45 is arranged spaced towards the front in the front end region of the outer casing 22, and has a bearing opening 46 through which a bearing bolt 48 extends in the direction of a pivot axis S, which lies horizontally and transversely to the longitudinal axis L. Pivoting about this pivot axis S allows a height adjustment of the casing unit 2 upward or downward in height direction H relative to the bracket 41, as indicated by the correspondingly marked double arrow, wherein accordingly the casing unit 2 is moved up or down between the side cheeks 43 and 44.

In FIG. 2, the side cheek 44 and a part segment of the outer casing 22 facing the observer have been omitted for greater clarity.

A clamping device 5, which is arranged on the carrier unit 4 (formed as a bracket), has a clamping bolt 51 which extends transversely to the longitudinal axis L through longitudinal holes 47 running substantially in the height direction H, in the two side cheeks 43, 44. At an end facing the observer in FIG. 1, a clamping lever 52 is arranged on the clamping bolt 51, with an abutment 53 at the other end which is supported from the outside against the side cheek 44.

The clamping bolt 51 cooperates with a clamping mechanism 54, for example a mechanism with a cam, wedge plate or tilt lever, which is supported from the outside on the side cheek 43 and, by means of the clamping lever 52, converts a rotation of the clamping bolt 51 into a transversely oriented tensile force with which the clamping bolt 51 clamps the two side cheeks 43 and 44 against each other and hence against the outside of the outer casing 22, whereby the casing unit 2 is fixed to the carrier unit 4 by force fit in the fixing position. At the same time, the applied clamping force clamps the inner casing 21 coaxially by force fit in the outer casing 22, so the longitudinal position is also fixed. For this, the outer casing 22 has a slot 220 in the direction of the longitudinal axis L, wherein the width of the slot 220 narrows as the clamping mechanism 54 is applied, and hence the outer casing acts as a clamp and holds the inner casing 21 in the fixing position.

A cable mounting 6 according to the invention is attached to the bottom of the inner casing 21, and in the example shown has the basic shape of a longitudinally elongate, U-shaped profile which is open towards the outside. The cable mounting 6 has at least one fastening element 61, by means of which a cable 62 can be fixed to the cable mounting 6, for example by force fit, form fit or substance bonding, or combinations thereof.

Figure 3:
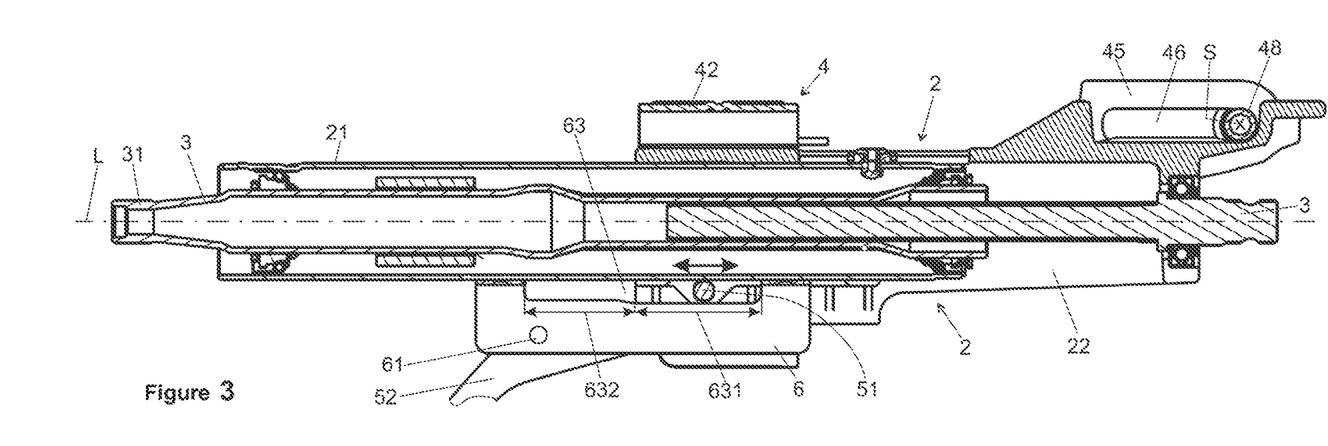
FIG. 3 is a longitudinal sectional view through the steering column from FIG. 1, in a normal operating state before a crash.

The cable mounting 6 has a longitudinal slot 63 extending in the longitudinal direction, through which passes the clamping bolt 51. The longitudinal slot 63 has an adjustment portion 631 and a deformation portion 632. The adjustment portion 631 has a length in the longitudinal direction which corresponds to the maximum length adjustment range of the inner casing 21 relative to the outer casing 22. In the adjustment portion 631, the longitudinal slot 63 has a greater width than the diameter of the clamping bolt 51 which is situated in the longitudinal slot 63, so that the clamping bolt 51 can be moved therein in the longitudinal direction unhindered, so that in normal operation, the inner casing 21 is freely positionable within the length adjustment range for length adjustment, as indicated in FIG. 3 by the double arrow. In the deformation portion 632 which adjoins the adjustment portion 631 at the rear, the longitudinal slot 63 has a smaller width than the diameter of the portion of the clamping bolt 51 which is situated in the longitudinal slot 63.

Figure 4:
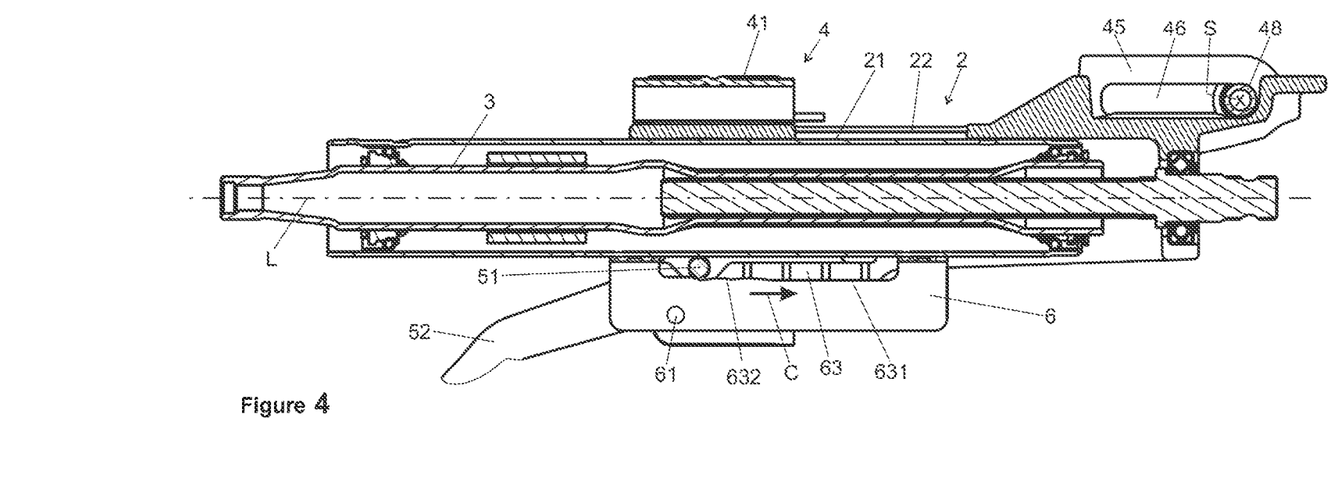
FIG. 4 is a longitudinal sectional view through the steering column from FIG. 3, in a state following a crash.

In a crash, the crash force acting forward in the direction of the longitudinal axis L on the steering spindle 3 and hence on the inner casing 21 is so great that the clamping force is overcome and the inner casing 21 is moved forward relative to the carrier unit 4 by a crash travel C beyond the proposed length adjustment range, as depicted in FIG. 4.

Thus the clamping bolt 51 is moved into the deformation portion 632 adjoining the adjustment portion 631, wherein the clamping bolt 61 widens the deformation portion 632 plastically, i.e. bends or crushes the side edges. The deformation work performed effects energy absorption.

Figure 5:
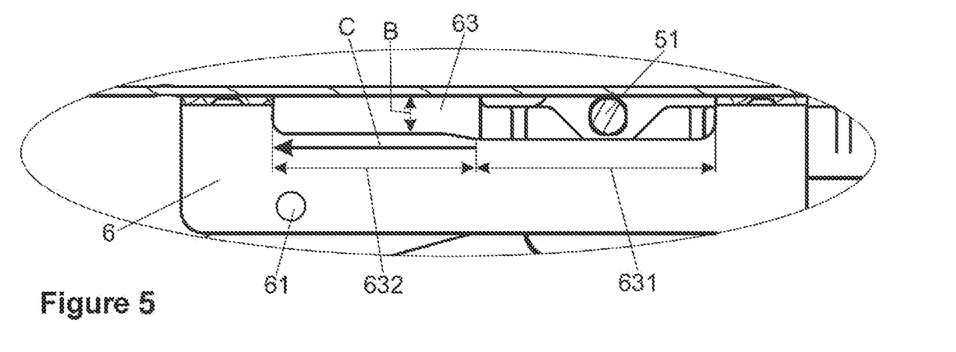
FIG. 5 is an enlarged detail view similar to FIG. 3 of an example cable mounting of a steering column.

The energy absorption characteristic may be predefined by the shape of the deformation portion 632, namely the curve of the width over the crash travel C. Thus the deformation portion 632 shown in FIG. 5 has a constant, smaller width B than the diameter of the portion of the clamping bolt 51 situated in the longitudinal slot 63, so that a constant energy absorption is achieved over the crash travel C, i.e. the length of the deformation portion 632.

Figure 6:
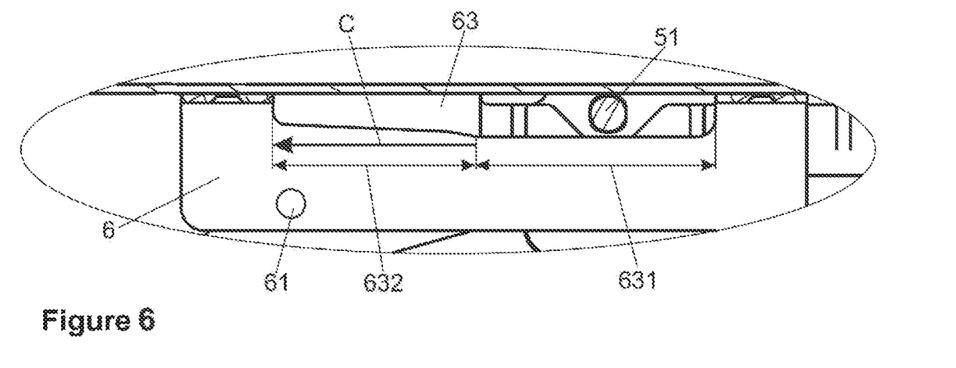
FIG. 6 is an enlarged detail view similar to FIG. 3 of another example cable mounting of a steering column.

In FIG. 6, the deformation portion 632 has a ramp-like or wedge-shaped contour, whereby the width diminishes continuously towards the front, and accordingly the energy absorption rises progressively when, in a crash, the clamping bolt moves along the crash path C into the deformation portion 632 which tapers in a wedge shape, and hence progressively displaces plastically ever more material.

Figure 7:
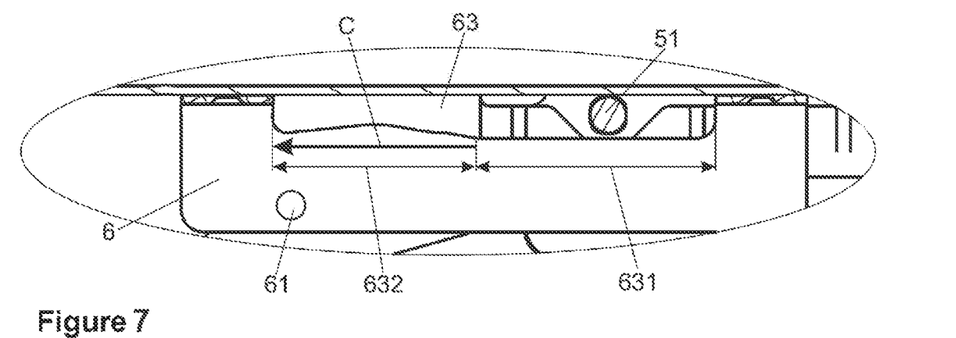
FIG. 7 is an enlarged detail view similar to FIG. 3 of yet another example cable mounting of a steering column.

FIG. 7 shows a further variant in which the width of the deformation portion 632 initially diminishes along the crash path C and then increases again, whereby the energy absorption initially rises and diminishes again towards the end of the crash process, so that a gentler deceleration occurs.

The exemplary embodiments depicted present the technical teaching that the change in width of the longitudinal slot 63 over the crash path determines the crash characteristic, and hence gives the person skilled in the art an effective means for adapting the crash characteristic (force-travel curve) according to the requirements.

Figure 8:
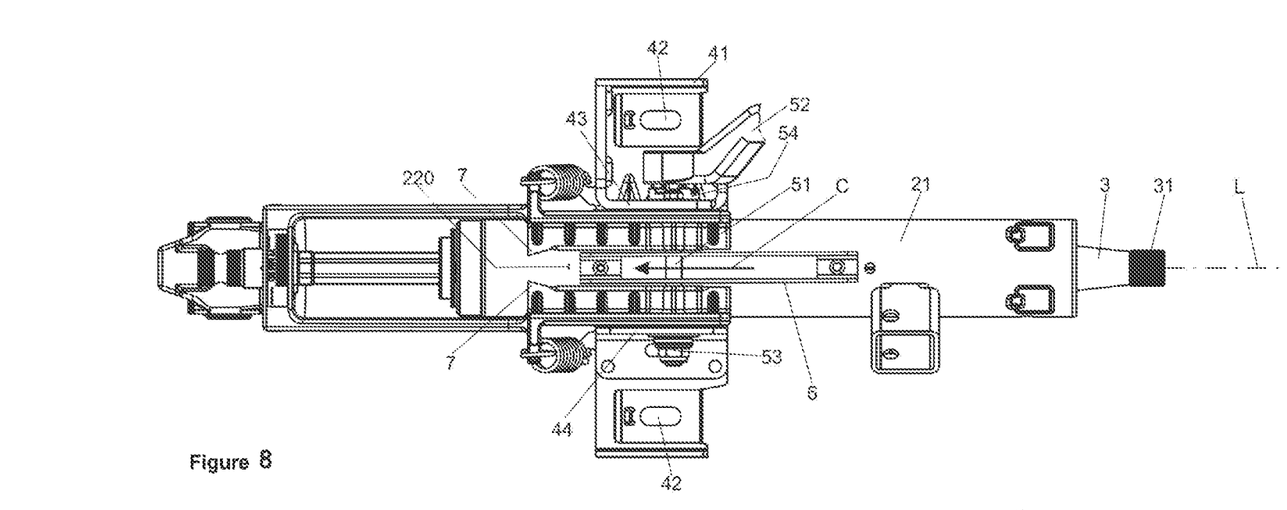
FIG. 8 is a bottom diagrammatic view of another example steering column.
Figure 9:
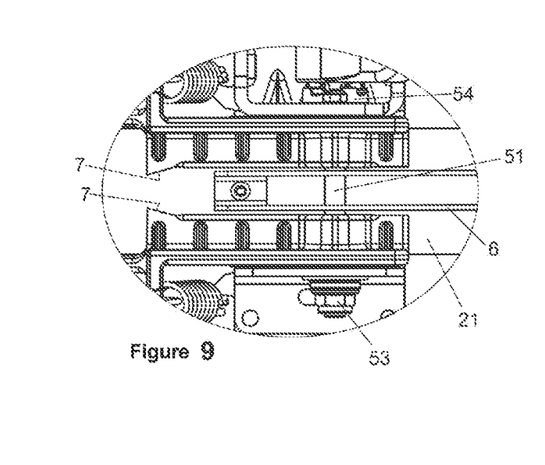
FIG. 9 is an enlarged detail view of the example steering column in FIG. 8 in a normal operating state before a crash.
Figure 10:
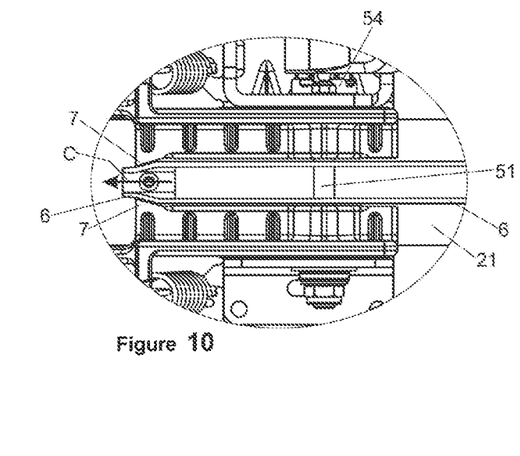
FIG. 10 is an enlarged detail view similar to FIG. 8, in a state following a crash.

FIGS. 8, 9 and 10 show a steering column 1 according to the invention in a second embodiment. The cable mounting 6 may be configured similarly, namely with a basic form of a U-shaped profile which is fixed in its back region to the inner casing 21, so that the profile opening at the bottom faces the observer in FIGS. 8, 9 and 10. In the depictions of FIGS. 8, 9 and 10, the slot 220 of the outer casing 22, which narrows on application of the clamping device 5, is clearly evident. The cable mounting 6 protrudes at least partially into the slot 220, depending on the position which the inner casing 21 takes relative to the outer casing 22. Additionally or alternatively to the energy absorption mechanisms explained with reference to FIGS. 1 to 7, the outer casing 21 here has a deformation element with deflection jaws 7, which protrude transversely from the side into the movement cross-section of the cable mounting 6 and form a constriction of the slot 220. In normal operation, the inner casing 21 can be telescopically adjusted in the longitudinal direction relative to the outer casing 22, as shown in FIG. 9. If however a high force acts in a crash, the cable mounting 6 is forced between the deflection jaws 7 with plastic deformation, as indicated in FIG. 10 by the arrow pointing to the left there, creating a deformed portion 64 to the left of the deflection jaws 7 in FIG. 10. The amount and curve of the energy absorption may be defined by the cross-sectional profile of the cable mounting 6 and the ratio of deformation between the deflection jaws or jaw 7. It is also possible and conceivable to split, cut away or otherwise plastically deform the cable mounting 6 on passage of the deformation element.

It is furthermore possible to implement a secondary energy absorption device by means of the carrier unit 4. For this, the fastening means 42 may be configured as a sliding shoe or capsule with longitudinal holes or similar extending in the longitudinal direction, which in a crash allow the carrier unit 4 to move forward relative to the body fastening points, i.e. move the entire steering column 1 moves forward relative to the body. For energy absorption, the bearing opening 46 formed in the pivot bearing 45 may also be configured as a longitudinal slot and have a deformation portion 49, as known for example from DE 10 2012 111 890 B3.

The cable mounting 6 may preferably be formed as a sheet metal part which may be connected to the inner casing 21, preferably by substance bonding and/or form fit, for example by a weld connection or by riveting, tox clinching, flanging or similar.

It is also conceivable and possible, as an alternative or in addition to the embodiment shown, to provide a cable mounting 6 with energy absorption according to the invention on the outer casing 22 and/or on the carrier unit 4.

LIST OF REFERENCE SIGNS

1 Steering column
2 Casing unit

21 Inner casing
22 Outer casing
220 Slot
3 Steering spindle
31 Fastening portion
4 Carrier unit
41 Bracket
42 Fastening means
43, 44 Side cheeks
45 Pivot bearing
46 Bearing opening
47 Longitudinal holes
48 Bearing bolt
49 Deformation portion
5 Clamping device
51 Clamping bolt
52 Clamping lever
53 Abutment
54 Clamping mechanism
6 Cable mounting
61 Fastening element
62 Cable
63 Longitudinal slot
631 Adjustment portion
632 Deformation portion
L Longitudinal axis
S Pivot axis
H Height direction
C Crash travel

What is claimed is:

1. A steering column for a motor vehicle comprising:
a casing unit that is directly or indirectly connectable to a body of the motor vehicle, wherein a steering spindle is mounted in the casing unit so as to be rotatable about a longitudinal axis, the casing unit including
an inner casing that is received in an outer casing so as to be telescopically adjustable in a direction of the longitudinal axis, and
a cable mounting that has a fastening element for holding a cable, the cable mounting being at least partially formed as a deformation element of an energy absorption device that is disposed between the inner casing and the outer casing, wherein the cable mounting has a U-shaped profile with an open portion of the U-shaped profile facing away form the casing unit; and
a clamping device configured to be switched between a fixing position where the clamping device fixes the inner casing relative to the outer casing and a release position where the clamping device allows telescopic adjustment of the inner casing relative to the outer casing.

2. The steering column of claim 1 wherein the cable mounting is attached to at least one of the inner casing or the outer casing.

3. The steering column of claim 1 wherein the cable mounting cooperates with means for deforming the deformation element, which upon relative movement of the inner casing and the outer casing is moved relative to the cable mounting and continuously deforms the cable mounting plastically in the direction of the longitudinal axis.

4. The steering column of claim 1 wherein the casing unit is mounted on a carrier unit that is connectable to the body of the motor vehicle.

5. The steering column of claim 4 wherein the carrier unit comprises at least one of a bracket or a pivot bearing.

6. The steering column of claim 4 wherein the clamping device is disposed on the carrier unit, which in the fixing position establishes the casing unit relative to the carrier unit and which in the release position allows adjustment of the casing unit relative to the carrier unit, at least in a height direction and/or in the direction of the longitudinal axis.

7. The steering column of claim 4 wherein the carrier unit comprises a secondary energy absorption device configured to absorb kinetic energy in a crash upon movement of the carrier unit relative to the body of the motor vehicle.

8. The steering column of claim 1 configured to receive the cable such that in a crash event relative movement between the cable mounting and the body of the vehicle causes the cable to be mechanically stressed so as to achieve energy absorption by friction and plastic deformation.

9. The steering column of claim 1 wherein the cable mounting is comprised of sheet metal.

10. The steering column of claim 9 wherein the sheet metal is welded to the inner casing.

11. A steering column for a motor vehicle comprising:
a casing unit that is directly or indirectly connectable to a body of the motor vehicle, wherein a steering spindle is mounted in the casing unit so as to be rotatable about a longitudinal axis, the casing unit including
an inner casing that is received in an outer casing so as to be telescopically adjustable in a direction of the longitudinal axis, and
a cable mounting that has a fastening element for holding a cable, the cable mounting being at least partially formed as a deformation element of an energy absorption device that is disposed between the inner casing and the outer casing; and
a clamping device configured to be switched between a fixing position where the clamping device fixes the inner casing relative to the outer casing and a release position where the clamping device allows telescopic adjustment of the inner casing relative to the outer casing,
wherein the clamping device includes a clamping bolt that is rotatable about a clamping axis that is transverse to the longitudinal axis and that is connected to a clamping mechanism, wherein in the fixing position the clamping bolt cooperates with the cable mounting to deform the cable mounting plastically during relative movement of the inner casing and the outer casing.

12. The steering column of claim 11 wherein the clamping bolt passes through a longitudinal slot formed in the cable mounting that includes a deformation portion.

13. The steering column of claim 11 wherein the clamping bolt extends through a longitudinal slot formed by and between the cable mounting and the inner casing, with the clamping bolt being directly adjacent to the inner casing.

14. The steering column of claim 11 wherein the longitudinal slot has an adjustment portion that is distinct from and demarcated from a deformation portion, with the longitudinal slot being free of any obstruction that extends more than halfway into a void of the longitudinal slot.

15. The steering column of claim 14 wherein in a longitudinal direction a size of an opening of the longitudinal slot within the deformation portion decreases and then increases.

16. A steering column for a motor vehicle comprising:
a casing unit that is directly or indirectly connectable to a body of the motor vehicle, wherein a steering spindle is mounted in the casing unit so as to be rotatable about a longitudinal axis, the casing unit including an inner casing that is received in an outer casing so as to be telescopically adjustable in a direction of the longitudinal axis, and a cable mounting that has a fastening element for holding a cable, the cable mounting being at least partially formed as a deformation element of an energy absorption device that is disposed between the inner casing and the outer casing; and a clamping device configured to be switched between a fixing position where the clamping device fixes the inner casing relative to the outer casing and a release position where the clamping device allows telescopic adjustment of the inner casing relative to the outer casing, wherein the cable mounting protrudes at least partially into a slot of the outer casing.

17. The steering column of claim 16 wherein the outer casing includes a deformation element with deflection jaws that protrude transversely to the longitudinal axis.

18. The steering column of claim 17 wherein the deflection jaws and the cable mounting are configured such that in a crash event the cable mounting is forced between the deflection jaws, which plastically deform the cable mounting and create a deformed portion of the cable mounting.

19. The steering column of claim 16 wherein during normal operation of the steering column prior to a crash event, the cable mounting is configured to translate within the slot of the outer casing to adjust a longitudinal extent of the steering column.

\* \* \* \* \*

UNITED STATES PATENT AND TRADEMARK OFFICE
CERTIFICATE OF CORRECTION

| | | |
|---|---|---|
| PATENT NO. | : 11,485,401 B2 | Page 1 of 1 |
| APPLICATION NO. | : 16/962591 | |
| DATED | : November 1, 2022 | |
| INVENTOR(S) | : Florian Päkel et al. | |

It is certified that error appears in the above-identified patent and that said Letters Patent is hereby corrected as shown below:

On the Title Page

Item (72) The "Country of Residence" for Inventor No. 3, Frank PASCH, stated as CH should read DE.

Signed and Sealed this
Twenty-eighth Day of February, 2023

Katherine Kelly Vidal
*Director of the United States Patent and Trademark Office*